(12) United States Patent
Bunker

(10) Patent No.: US 9,327,384 B2
(45) Date of Patent: May 3, 2016

(54) COMPONENTS WITH COOLING CHANNELS AND METHODS OF MANUFACTURE

(75) Inventor: Ronald Scott Bunker, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 569 days.

(21) Appl. No.: 13/168,117

(22) Filed: Jun. 24, 2011

(65) Prior Publication Data

US 2012/0325451 A1    Dec. 27, 2012

(51) Int. Cl.
*F01D 5/18* (2006.01)
*B24C 1/04* (2006.01)
*C23C 4/04* (2006.01)
*F01D 5/28* (2006.01)

(52) U.S. Cl.
CPC . *B24C 1/045* (2013.01); *C23C 4/04* (2013.01); *C23C 4/073* (2016.01); *F01D 5/186* (2013.01); *F01D 5/187* (2013.01); *F01D 5/288* (2013.01); *F05D 2230/90* (2013.01); *Y02T 50/672* (2013.01); *Y02T 50/676* (2013.01)

(58) Field of Classification Search
CPC ..................................................... B23K 6/388
USPC .................. 416/97 R, 92, 95, 235, 236 R
See application file for complete search history.

(56) References Cited

U.S. PATENT DOCUMENTS

| 4,338,360 | A | * | 7/1982 | Cavanagh | F23R 3/002 427/247 |
| 5,152,667 | A | * | 10/1992 | Turner | F01D 5/187 416/97 R |
| 5,626,462 | A | | 5/1997 | Jackson et al. | |
| 5,640,767 | A | | 6/1997 | Jackson et al. | |
| 5,647,202 | A | * | 7/1997 | Althaus | F02K 1/822 165/908 |
| 5,649,806 | A | * | 7/1997 | Scricca | F01D 11/08 415/115 |

(Continued)

FOREIGN PATENT DOCUMENTS

| EP | 1304395 A1 | 4/2003 |
| EP | 1387040 B1 | 4/2004 |

OTHER PUBLICATIONS

Search Report and Written Opinion from corresponding EP Application No. 12172824.0 dated Sep. 4, 2012.

(Continued)

*Primary Examiner* — Craig Kim
*Assistant Examiner* — Kayla McCaffrey
(74) *Attorney, Agent, or Firm* — Ann M. Agosti

(57) ABSTRACT

A manufacturing method includes forming one or more grooves in a component that comprises a substrate with an outer surface. The substrate has at least one interior space, and each groove extends at least partially along the substrate and has a base. The manufacturing method further includes forming one or more access holes through the base of a respective groove, to connect the groove in fluid communication with the respective hollow interior space. The manufacturing method further includes forming at least one connecting groove in the component, such that each connecting groove intersects at least a subset of the one or more grooves. The manufacturing method further includes disposing a coating over at least a portion of the outer surface of the substrate, such that the groove(s) and the coating together define one or more channels for cooling the component. The coating does not completely bridge the connecting groove, such that the connecting groove at least partially defines an exit region for the respective cooling channel(s).

18 Claims, 5 Drawing Sheets

(56) References Cited

U.S. PATENT DOCUMENTS

| | | | |
|---|---|---|---|
| 5,875,549 A | | 3/1999 | McKinley |
| 5,941,686 A | * | 8/1999 | Gupta et al. ................ 415/178 |
| 6,214,248 B1 | | 4/2001 | Browning et al. |
| 6,234,755 B1 | | 5/2001 | Bunker et al. |
| 6,282,905 B1 | * | 9/2001 | Sato .................. F23R 3/002 60/752 |
| 6,321,449 B2 | | 11/2001 | Zhao et al. |
| 6,368,060 B1 | | 4/2002 | Fehrenbach et al. |
| 6,380,512 B1 | * | 4/2002 | Emer .................. 219/121.71 |
| 6,383,602 B1 | | 5/2002 | Fric et al. |
| 6,412,541 B2 | | 7/2002 | Roesler et al. |
| 6,551,061 B2 | | 4/2003 | Darolia et al. |
| 6,582,194 B1 | | 6/2003 | Birkner et al. |
| 6,602,053 B2 | | 8/2003 | Subramanian et al. |
| 6,617,003 B1 | | 9/2003 | Lee et al. |
| 6,905,302 B2 | * | 6/2005 | Lee .................. F01D 5/288 415/115 |
| 6,921,014 B2 | | 7/2005 | Hasz et al. |
| 7,014,923 B2 | | 3/2006 | Schnell et al. |
| 7,094,475 B2 | | 8/2006 | Schnell et al. |
| 7,186,167 B2 | | 3/2007 | Joslin |
| 7,302,990 B2 | | 12/2007 | Bunker et al. |
| 7,553,534 B2 | * | 6/2009 | Bunker .................. 428/137 |
| 7,625,180 B1 | * | 12/2009 | Liang .................. 416/97 R |
| 7,744,348 B2 | | 6/2010 | Bezencon et al. |
| 7,766,617 B1 | | 8/2010 | Liang |
| 7,775,768 B2 | | 8/2010 | Devore et al. |
| 7,866,948 B1 | * | 1/2011 | Liang .................. 416/97 R |
| 8,959,886 B2 | * | 2/2015 | Lee .................. F23R 3/005 60/39.37 |
| 2002/0141872 A1 | * | 10/2002 | Darolia et al. .......... 416/241 R |
| 2003/0077434 A1 | * | 4/2003 | Jansen et al. .......... 428/220 |
| 2007/0253817 A1 | * | 11/2007 | Bezencon et al. ........ 416/97 R |
| 2008/0138529 A1 | | 6/2008 | Weaver et al. |
| 2009/0003989 A1 | * | 1/2009 | Guemmer .................. 415/115 |
| 2010/0080688 A1 | | 4/2010 | Bezencon et al. |
| 2012/0111545 A1 | | 5/2012 | Bunker et al. |
| 2012/0148769 A1 | | 6/2012 | Bunker et al. |

OTHER PUBLICATIONS

D.G. Hyams et al., "A Detailed Analysis of film Cooling Physics: Part III—Streamwise Injection With Shaped Holes," Journal of Turbomachinery, vol. 122, Issue 1, Jan. 2000, pp. 122-132.

B. Wei et al., "Curved Electrode and Electrochemical Machining Method and Assembly Employing the Same," U.S. Appl. No. 12/562,528, filed Sep. 18, 2009.

W. Zhang et al., Process and System for Forming Shaped Air Holes, U.S. Appl. No. 12/697,005, filed Jan. 29, 2010.

B.P. Lacy et al., "Hot Gas Path Component Cooling System," U.S. Appl. No. 12/765,372, filed Apr. 22, 2010.

B. Lacy et a., "Articles Which Include Chevron Film Cooling Holes, and Related Processes," U.S. Appl. No. 12/790,675, filed May 28, 2010.

J.E.J. Lambie et al., "An overview on micro-meso manufacturing techniques for micro-heat exchangers for turbine blade cooling," International Journal Manufacturing Research, vol. 3, No. 1, 2008, pp. 3-26.

R.S. Bunker et al., "Components With Re-Entrant Shaped Cooling Channels and Methods of Manufacture," U.S. Appl. No. 12/943,624, filed Nov. 10, 2010.

R.S. Bunker et al., "Component and Methods of Fabricating and Coating a Component," U.S. Appl. No. 12/943,646, filed Nov. 10, 2010.

R.S.Bunker et al., "Method of Fabricating a Component Using a Fugitive Coating," U.S. Appl. No. 12/943,563, filed Nov. 10, 2010.

R.S. Bunker et al., "Components With Cooling Channels and Methods of Manufacture," U.S. Appl. No. 12/965,083, filed Dec. 10, 2010.

R. S. Bunker et al., "Method of Fabricating a Component Using a Two-Layer Structural Coating," U.S. Appl. No. 12/996,101, filed Dec. 13, 2010.

R.S. Bunker et al., "Turbine Components With Cooling Features and Methods of Manufacturing the Same," U.S. Appl. No. 12/953,177, filed Nov. 23, 2010.

R.S. Bunker, "Components With Cooling Channels and Methods of Manufacture," U.S. Appl. No. 13/026,595, filed Feb. 14, 2011.

R. Rebak et al., "Methods of Fabricating a Coated Component Using Multiple Types of Fillers," U.S. Appl. No. 13/083,701, filed Apr. 11, 2011.

R. Bunker et al., "Components With Cooling Channels Formed in Coating and Methods of Manufacture", U.S. Appl. No. 13/052,415, filed Mar. 21, 2011.

R.B. Rebak et al., "Component and Methods of Fabricating a Coated Component Using Multiple Types of Fillers," U.S. Appl. No. 13/095,129, filed Apr. 27, 2011.

Translation of CN Office Action issued on Feb. 4, 2015 in relation to corresponding Chinese application 201210213998.4.

\* cited by examiner

COMPONENTS WITH COOLING CHANNELS AND METHODS OF MANUFACTURE

BACKGROUND

The invention relates generally to gas turbine engines, and, more specifically, to micro-channel cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve a long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary gas turbine engine components, thin metal walls of high strength superalloy metals are typically used for enhanced durability while minimizing the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and coatings. However, this cooling strategy typically results in comparatively low heat transfer rates and non-uniform component temperature profiles.

Micro-channel cooling has the potential to significantly reduce cooling requirements by placing the cooling as close as possible to the heated region, thus reducing the temperature difference between the hot side and cold side of the main load bearing substrate material for a given heat transfer rate. However, current techniques for forming micro-channel cooled components typically require the formation of individual film exit holes for each of the micro-channels. As hot gas path components may include hundreds of micro-channels, the formation of individual film exit holes would thus necessitate the precision location of hundreds of individual holes, which would add to the overall manufacturing cost of the component.

It would therefore be desirable to provide more economical and efficient means for forming exit regions for micro-channels.

BRIEF DESCRIPTION

One aspect of the present invention resides in a manufacturing method that includes forming one or more grooves in a component that comprises a substrate with an outer surface. The substrate has at least one interior space, and each groove extends at least partially along the substrate and has a base. The manufacturing method further includes forming one or more access holes through the base of a respective groove, to connect the groove in fluid communication with the respective hollow interior space. The manufacturing method further includes forming at least one connecting groove in the component, such that each connecting groove intersects at least a subset of the one or more grooves. The manufacturing method further includes disposing a coating over at least a portion of the outer surface of the substrate, such that the groove(s) and the coating together define one or more channels for cooling the component. The coating does not completely bridge the connecting groove, such that the connecting groove at least partially defines an exit region for the respective one or more cooling channels.

Another aspect of the present invention resides in a component that includes a substrate comprising an outer surface and an inner surface, where the inner surface defines at least one interior space. The component defines one or more grooves, where each groove extends at least partially along the substrate and has a base. One or more access holes are formed through the base of a respective groove, to connect the groove in fluid communication with respective ones of the at least one interior space. The component further defines at least one connecting groove that intersects at least a subset of the one or more grooves. The component further includes a coating disposed over at least a portion of the outer surface of the substrate. The groove(s) and the coating together define one or more channels for cooling the component. The coating does not completely bridge the connecting groove, such that the connecting groove at least partially defines an exit region for the respective one or more cooling channels.

DRAWINGS

These and other features, aspects, and advantages of the present invention will become better understood when the following detailed description is read with reference to the accompanying drawings in which like characters represent like parts throughout the drawings, wherein.

Figure 3:
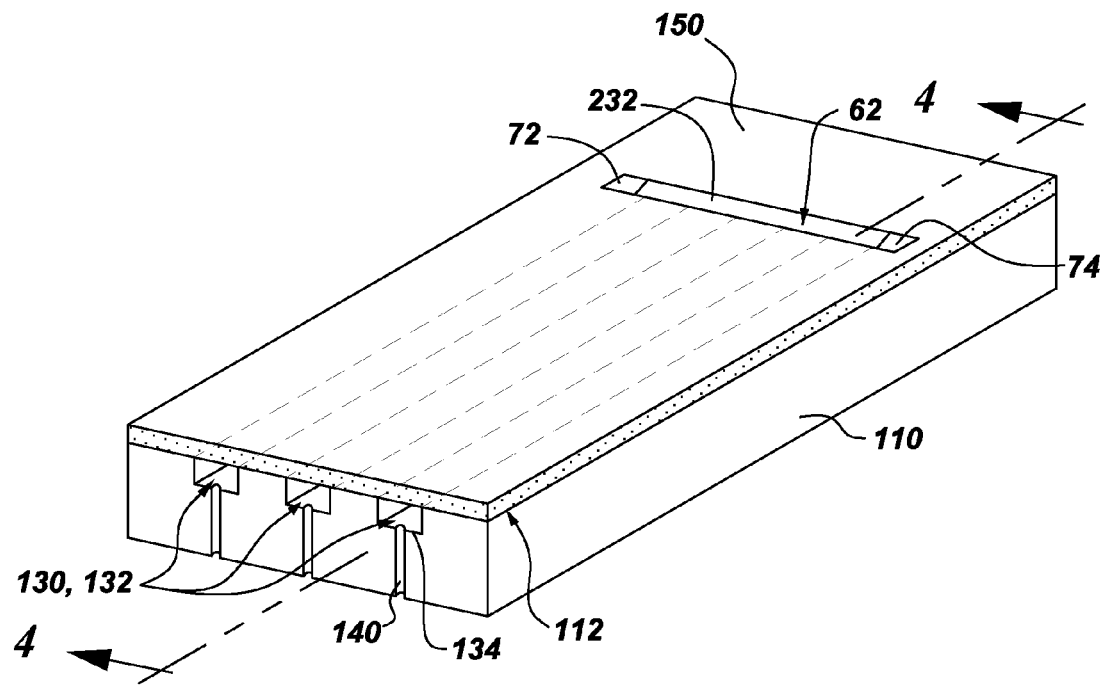
Figure 4:
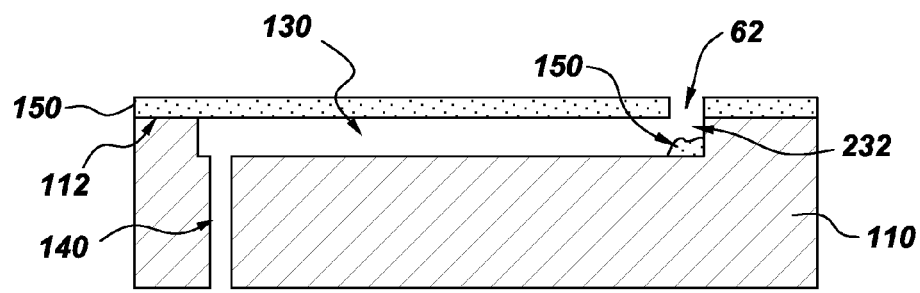
Figure 5:
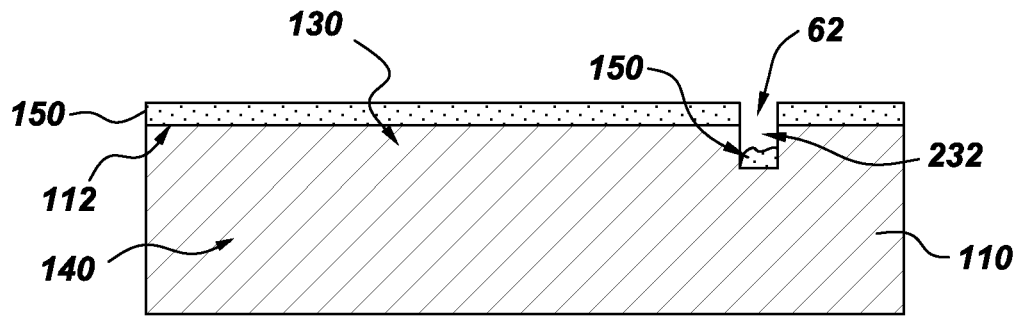
Figure 6:
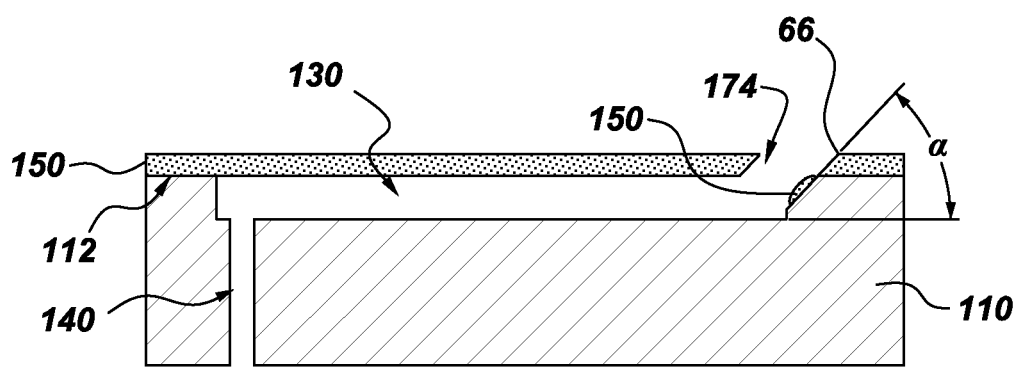
Figure 7:
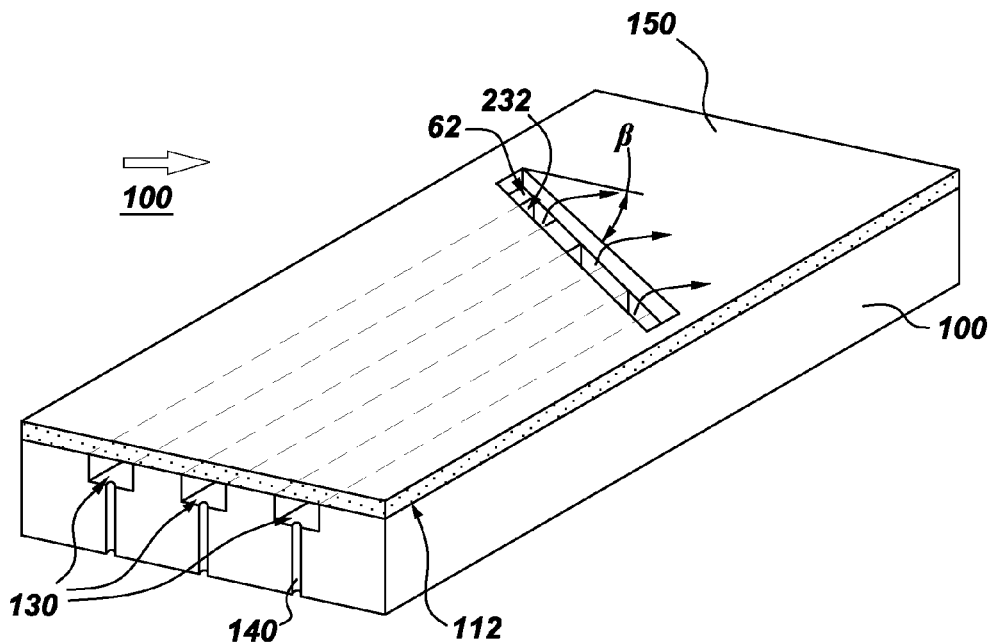
Figure 8:
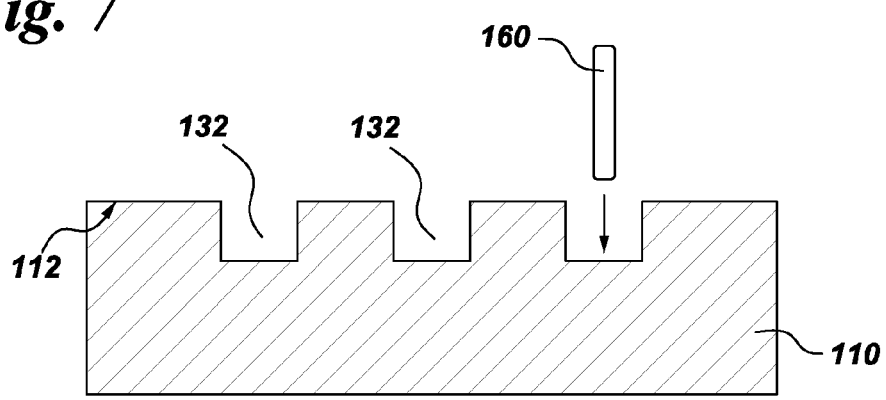
Figure 9:
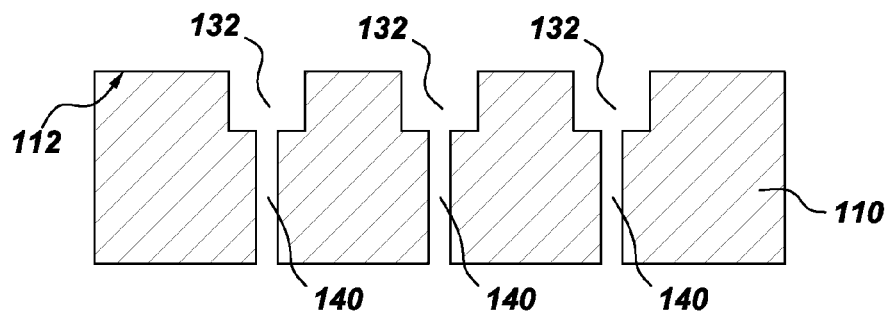
Figure 10:
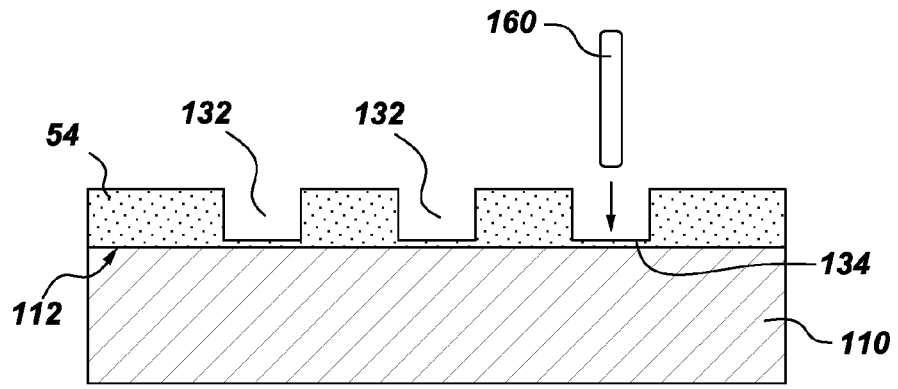
Figure 11:
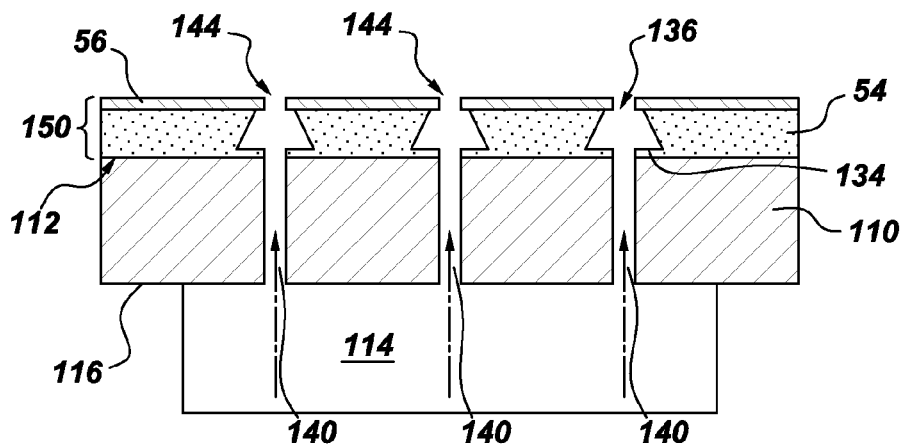
Figure 12:
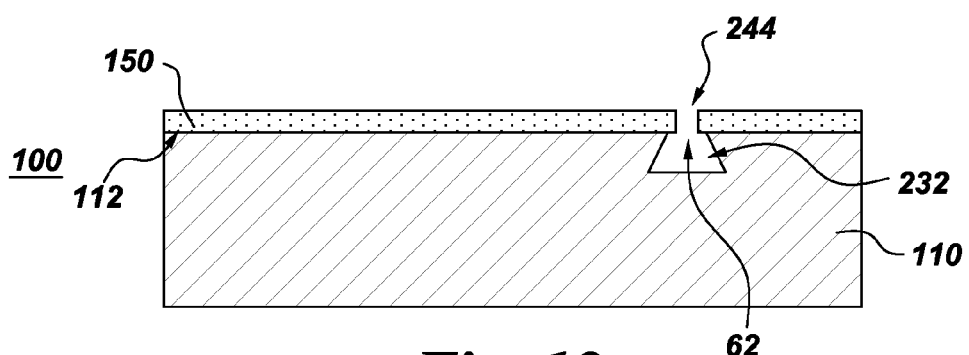

FIG. 3 schematically depicts, in perspective view, three example open shaped cooling grooves that extend partially along the surface of the substrate and channel coolant to an exit region formed by a connecting groove;

FIG. 4 is a cross-sectional view of one of the example cooling channels of FIG. 3 and shows the channel conveying coolant from an access hole to an exit region formed by a connecting groove;

FIG. 5 is a cross-section of the component of FIG. 3 that does not coincide with one of the cooling channels;

FIG. 6 is a cross-sectional view of an example cooling channel for conveying coolant from an access hole to an exit region formed by a connecting groove with an angled exit wall;

FIG. 7 schematically depicts, in perspective view, three example open shaped cooling grooves that extend partially along the surface of the substrate and channel coolant to an exit region formed by a connecting groove that has a non-orthogonal angle of incidence relative to the cooling channels;

FIGS. 8 and 9 illustrate example process steps for forming a component;

FIG. 10 schematically illustrates a process step for forming channels in a structural coating;

FIG. 11 shows re-entrant shaped channels with permeable slots formed in a structural coating; and FIG. 12 illustrates a re-entrant shaped connecting groove with a permeable slot formed through the coating.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
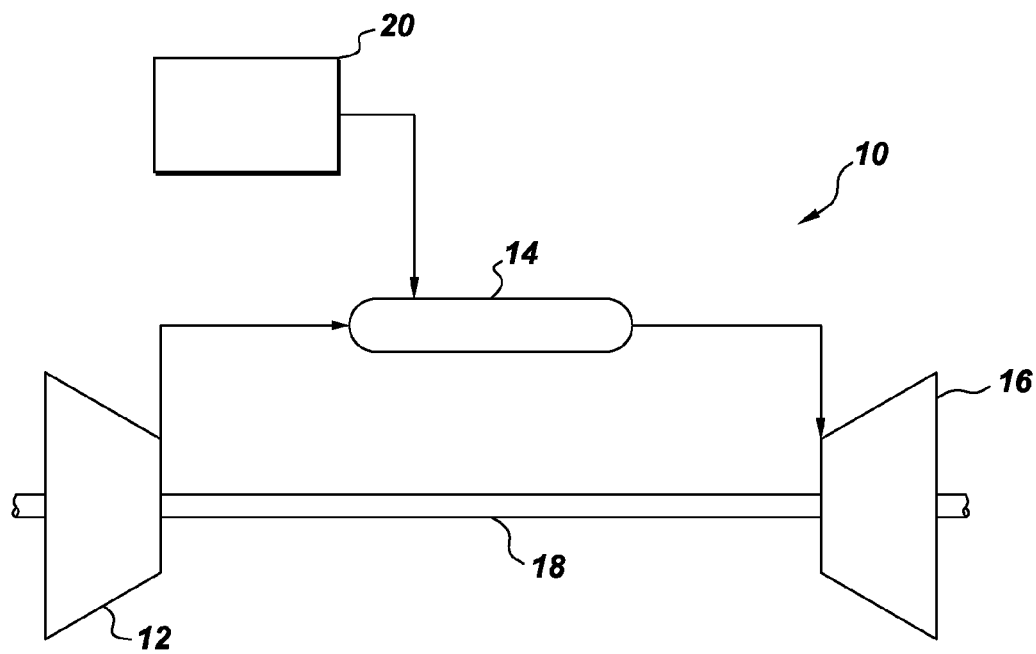
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shaft 18. The shaft 18 may be a single shaft or multiple shaft segments coupled together to form shaft 18.

The gas turbine system 10 may include a number of hot gas path components 100. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and compressor exhaust components are all hot gas path components. However, it should be understood that the hot gas path component 100 of the present invention is not limited to the above examples, but may be any component that is at least partially exposed to a high temperature flow of gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow 80, the hot gas path component 100 is heated by the hot gas flow 80 and may reach a temperature at which the hot gas path component 100 fails. Thus, in order to allow system 10 to operate with hot gas flow 80 at a high temperature, increasing the efficiency and performance of the system 10, a cooling system for the hot gas path component 100 is required.

In general, the cooling system of the present disclosure includes a series of small channels, or micro-channels, formed in the surface of the hot gas path component 100. For industrial sized power generating turbine components, "small" or "micro" channel dimensions would encompass approximate depths and widths in the range of 0.25 mm to 1.5 mm, while for aviation sized turbine components channel dimensions would encompass approximate depths and widths in the range of 0.15 mm to 0.5 mm. The hot gas path component may be provided with a cover layer. A cooling fluid may be provided to the channels from a plenum, and the cooling fluid may flow through the channels, cooling the cover layer.

A manufacturing method is described with reference to FIGS. 2-12. As indicated for example in FIG. 8, the manufacturing method includes forming one or more grooves 132 in a component 100 (schematically depicted, for example, in FIG. 3) that comprises a substrate 110 with an outer surface 112. As indicated, for example, in FIG. 3, each groove 132 extends at least partially along the substrate 110 and has a base 134. Although the grooves are shown as having straight walls, the grooves 132 can have any configuration, for example, they may be straight, curved, or have multiple curves. As indicated, for example, in FIGS. 2 and 11, the substrate 110 has at least one interior space 114.

The substrate 110 is typically cast prior to forming the grooves 132 and the connecting grooves 232. As discussed in U.S. Pat. No. 5,626,462, substrate 110 may be formed from any suitable material. Depending on the intended application for component 100, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5)Al-(4.5-7.9)Cr-(1.5-5.5)Hf-(0-6)V, where the composition ranges are in atom percent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and $Mo_3Si$ second phases. For other configurations, the substrate material comprises a ceramic matrix composite, such as a silicon carbide (SiC) matrix reinforced with SiC fibers. For other configurations the substrate material comprises a TiAl-based intermetallic compound.

For the example process shown in FIG. 9, the component fabrication method further includes forming one or more access holes 140 through the base 134 of a respective one of the grooves 132, to provide fluid communication between the grooves 132 and the respective interior space(s) 114. The access holes 140 are typically formed after the grooves 132.

The access holes 140 are typically circular or oval in cross-section and may be formed, for example using one or more of laser machining (laser drilling), abrasive liquid jet, EDM and electron beam drilling. The access holes 140 may be normal to the base 134 of the respective grooves 132 (as shown in FIG. 9) or, more generally, may be drilled at angles in a range of 20-90 degrees relative to the base 134 of the groove 132.

As indicated, for example, in FIG. 3, the method further includes forming at least one connecting groove 232 in the component 100 such that each connecting groove 232 intersects at least a subset of the one or more grooves 132. Although the connecting grooves 232 are shown as having straight walls, the connecting grooves 232 can have any configuration, for example, they may be straight, curved, or have multiple curves.

The grooves 132 and connecting grooves 232 may be formed using a variety of techniques. For example, the grooves 132 and connecting grooves 232 may be formed using one or more of an abrasive liquid jet, plunge electro-chemical machining (ECM), electric discharge machining with a spinning single point electrode (milling EDM), and laser machining (laser drilling). Example laser machining techniques are described in commonly assigned, U.S. patent application Ser. No. 12/697,005, "Process and system for forming shaped air holes" filed Jan. 29, 2010, which is incorporated by reference herein in its entirety. Example EDM techniques are described in commonly assigned U.S. patent application Ser. No. 12/790,675, "Articles which include chevron film cooling holes, and related processes," filed May 28, 2010, which is incorporated by reference herein in its entirety.

For particular process configurations, the grooves 132 and the connecting grooves are formed by directing an abrasive liquid jet 160 at the first layer of the structural coating 54, as schematically depicted in FIG. 10 (for the grooves 132). For example processes, the abrasive liquid jet 160 is used to form each connecting groove 232 to the same depth as that of the respective channel 130. Example water jet drilling processes and systems are provided in commonly assigned U.S. patent application Ser. No. 12/790,675, "Articles which include chevron film cooling holes, and related processes," filed May 28, 2010, which is incorporated by reference herein in its entirety. As explained in U.S. patent application Ser. No. 12/790,675, the water jet process typically utilizes a high-velocity stream of abrasive particles (e.g., abrasive "grit"), suspended in a stream of high pressure water. The pressure of the water may vary considerably, but is often in the range of about 35-620 MPa. A number of abrasive materials can be used, such as garnet, aluminum oxide, silicon carbide, and glass beads.

In addition, and as explained in U.S. patent application Ser. No. 12/790,675, the water jet system can include a multi-axis computer numerically controlled (CNC) unit. The CNC systems themselves are known in the art, and described, for example, in U.S. Patent Publication 1005/0013926 (S. Rutkowski et al), which is incorporated herein by reference. CNC systems allow movement of the cutting tool along a number of X, Y, and Z axes, as well as rotational axes.

As indicated, for example, in FIG. 3, the component fabrication method further includes disposing a coating 150 over at least a portion of the outer surface 112 of the substrate 110, such that the one or more grooves 132 and the coating 150 together define one or more channels 130 for cooling the component 100. It should be noted that although the grooves 132 and channels 130 are shown as being rectangular in FIG. 3, they may also take on other shapes. For example, the grooves 132 (and channels 130) may be re-entrant grooves 132 (re-entrant channels 130), as described below with reference to FIG. 11. As indicated, for example, in FIG. 3 the coating 150 does not completely bridge the connecting groove 232, such that the connecting groove 232 at least partially defines an exit region 62 for the respective cooling channel(s) 130.

Coating 150 comprises a suitable material and is bonded to the component. For particular configurations, the coating 150 has a thickness in the range of 0.1-2.0 millimeters, and more particularly, in the range of 0.1 to 1 millimeter, and still more particularly 0.1 to 0.5 millimeters for industrial components. For aviation components, this range is typically 0.1 to 0.25 millimeters. However, other thicknesses may be utilized depending on the requirements for a particular component 100.

The coating 150 comprises structural coating layers and may further include optional additional coating layer(s). The coating layer(s) may be deposited using a variety of techniques. For particular processes, the structural coating layer (s) are deposited by performing an ion plasma deposition (cathodic arc). Example ion plasma deposition apparatus and method are provided in commonly assigned, US Published Patent Application No. 10080138529, Weaver et al, "Method and apparatus for cathodic arc ion plasma deposition," which is incorporated by reference herein in its entirety. Briefly, ion plasma deposition comprises placing a cathode formed of a coating material into a vacuum environment within a vacuum chamber, providing a substrate 110 within the vacuum environment, supplying a current to the cathode to form a cathodic arc upon a cathode surface resulting in arc-induced erosion of coating material from the cathode surface, and depositing the coating material from the cathode upon the substrate surface 112.

Non-limiting examples of a coating deposited using ion plasma deposition include structural coatings, as well as bond coatings and oxidation-resistant coatings, as discussed in greater detail below with reference to U.S. Pat. No. 5,626,462. For certain hot gas path components 100, the structural coating comprises a nickel-based or cobalt-based alloy, and more particularly comprises a superalloy or a (NiCo)CrAlY alloy. For example, where the substrate material is a Ni-base superalloy containing both γ and γ' phases, structural coating may comprise similar compositions of materials, as discussed in greater detail below with reference to U.S. Pat. No. 5,626,462.

For other process configurations, a structural coating is deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also know as vacuum plasma spray or VPS). In one non-limiting example, a NiCrAlY coating is deposited by HVOF or HVAF. Other example techniques for depositing the structural coating include, without limitation, sputtering, electron beam physical vapor deposition, electroless plating, and electroplating.

For certain configurations, it is desirable to employ multiple deposition techniques for depositing structural and optional additional coating layers. For example, a first structural coating layer may be deposited using an ion plasma deposition, and a subsequently deposited layer and optional additional layers (not shown) may be deposited using other techniques, such as a combustion spray process or a plasma spray process. Depending on the materials used, the use of different deposition techniques for the coating layers may provide benefits in properties, such as, but not restricted to strain tolerance, strength, adhesion, and/or ductility.

For the example arrangement shown in FIGS. 4 and 5, each connecting groove 232 is open-shaped, and a portion of the coating 150 may be disposed in the exit region 62 of the respective connecting groove 232. As used herein, an "open-shaped" groove (or channel) should be understood to be a groove (or channel) where the top opening is locally of similar width or greater than the rest of the groove (or channel). For particular processes, the manufacturing method further comprises removing at least a portion of the coating 150 disposed in each exit region 62. For example, a portion of the coating may remain within the exit regions after the optional removal process, or all of the coating may be removed from the exit regions during the optional removal process. The abrasive liquid jet 160 may be used to remove some or all of the deposited coatings from the exit region 62. However, for the illustrated processes, some residual coating remains within the exit region 62 and serves as protective material, for example oxidation resistance. For example, the structural (metallic) coating layer may be left inside the exit region, for certain configurations, and the ceramic thermal barrier coating (TBC) may be removed, for example using the abrasive liquid jet 160. Beneficially, the residual structural coating within the exit region will act as a cooling flow distributor, forcing the coolant to spread out inside the exit region prior to exiting onto the external surface of the coated component.

For the example configurations shown in FIGS. 3 and 7, the grooves 132 and connecting grooves 232 are formed in the outer surface 112 of the substrate 110. FIGS. 10 and 11 illustrate related processes where the grooves 132 and connecting grooves 232 are formed at least partially in a structural coating 54. For the example configurations shown in FIGS. 10 and 11, the coating 150 comprises an outer layer 56 of a structural coating, and the manufacturing method further includes depositing an inner layer 54 of a structural coating on the outer surface 112 of the substrate (110) prior to forming the grooves 132 and connecting grooves 232. As indicated in FIG. 10, each of the grooves 132 and connecting groove 232 are formed at least partially in the inner structural coating 54. For the configurations shown in FIGS. 10 and 11, the grooves and connecting grooves do not extend into the substrate 110. For other configurations, the grooves and connecting grooves extend through the inner structural coating layer 54 into the substrate and are formed by machining the substrate 110 through the inner structural coating layer 54. In addition, although not expressly shown, the grooves and connecting grooves may be formed by machining through a fugitive coating, as discussed in commonly assigned U.S. patent application Ser. No. 12/943,563, Ronald S. Bunker et al., "Method of fabricating a component using a fugitive coating," which is incorporated by reference herein in its entirety.

Although the transition regions connecting the respective grooves and exit regions 62 are shown in FIG. 4 as having sharp corners, these transition regions need not be formed of strictly sharp corners, but rather may have rounded or angled features to ease the required precision of machining, and furthermore may vary from one location to another. In addition, although the ends 72 and 74 of the exit region 62 are shown in FIG. 3 as being formed with sharp intersections, the ends 72 and 74 of the exit region need not be precisely formed of sharp intersections, but can be angled or have radius features, again to ease manufacturing tolerance requirements.

As noted above, although the grooves 132 and channels 130 are shown as being rectangular in FIG. 3, they may also take on other shapes. For the example arrangement shown in FIG. 11, the base 134 of each groove is wider than the top 136, such that each groove 132 comprises a re-entrant shaped groove 132. Although the re-entrant shaped grooves 132 are formed in an inner structural coating 54 for the arrangement shown in FIG. 11, they may be formed in the substrate 110 for other configurations or may be formed partially an inner structural coating 54 and extend into the substrate 110 for other arrangements (not shown). For particular configurations, the base 134 of a respective one of the re-entrant shaped grooves 132 is at least two times wider than the top 136 of the respective groove 132. For more particular configurations, the base 134 of the respective re-entrant shaped groove 132 is at least three times, and more particularly, is in a range of about 3-4 times wider than the top 136 of the respective groove 132. Techniques for forming re-entrant grooves 132 are provided in commonly assigned, U.S. patent application, Ser. No. 12/943,624, Ronald S. Bunker et al., "Components with re-entrant shaped cooling channels and methods of manufacture," which patent application is incorporated by reference herein in its entirety. Beneficially, the coating 150 can be deposited over unfilled re-entrant grooves 132 (that is, without filling or partial filling the groove with a sacrificial filler). In addition, the re-entrant grooves provide enhanced cooling relative to a simple shaped groove (namely, grooves with tops 136 and bases of approximately equal width). Further, for particular arrangements, permeable slots 144 (porous gaps 144) may extend through at least partially through coating 150, as indicated in FIG. 11.

For particular configurations, each connecting groove 232 is re-entrant shaped (FIG. 12) and a permeable slot 244 (FIG. 12) extends through the coating 150 in the exit region 62 for the connecting groove 232. More particularly, for particular arrangements the coating defines one or more permeable slots 244 (porous gaps 244), such that the coating does not completely bridge each of the one or more connecting grooves 232. Although the permeable slots 244 are shown for the case of re-entrant connecting grooves 232, permeable slots 244 may also be formed for other connecting groove geometries. Typically the permeable slots (gaps) 244 have irregular geometries, with the width of the gap 244 varying, as the coating is applied and builds up a thickness. As the coating is applied to the substrate 110, the width of the gap 244 may narrow from approximately the width of the top of the connecting groove 232, as the coating is built up. For particular examples, the width of gap 244, at its narrowest point, is 5% to 20% of the width of the respective top of the connecting groove 232. In addition, the permeable slot 244 may be porous, in which case the "porous" gap 244 may have some connections, that is, some spots or localities that have zero gap. Beneficially, the permeable slot 244 can serve as a cooling means when it extends through all coatings, that is for this configuration, the permeable slots 244 are configured to convey a coolant fluid from the connecting groove 232 to an exterior surface of the component. In addition the method may further include forming at least one exit hole through the permeable slot 244. For example, some remaining coating may be removed using one or more of a variety of techniques, including abrasive liquid jet, plunge ECM, EDM with a spinning electrode (milling EDM), conventional EDM (the electrode does not spin) and laser machining.

Beneficially, the above-described aspects of the manufacturing method facilitate the formation of the connecting exit regions in the same manner and as part of the same machining process as the regular cooling channels. This eliminates any need for setting up a separate machining process to remove the coatings to connect the exits. Further, re-entrant shaped connecting channels may be coated in the same process as the other grooves. As noted above, this may result in a permeable slot being formed through the coatings. This permeable slot may then be opened further or made into a definitive exit slot or a series of exit holes, for example using a process such as an abrasive liquid jet.

A component 100 is described with reference to FIGS. 2-12. As indicated, for example, in FIG. 2, the component 100 includes a substrate 110 comprising an outer surface 112 and an inner surface 116. As indicated, for example, in FIG. 2, the inner surface 116 defines at least one interior space 114. As indicated, for example in FIGS. 2 and 3, one or more grooves 132 are formed in the component 100. As indicated, for example, in FIG. 3, each groove 132 extends at least partially along the substrate 110 and has a base 134.

Figure 2:
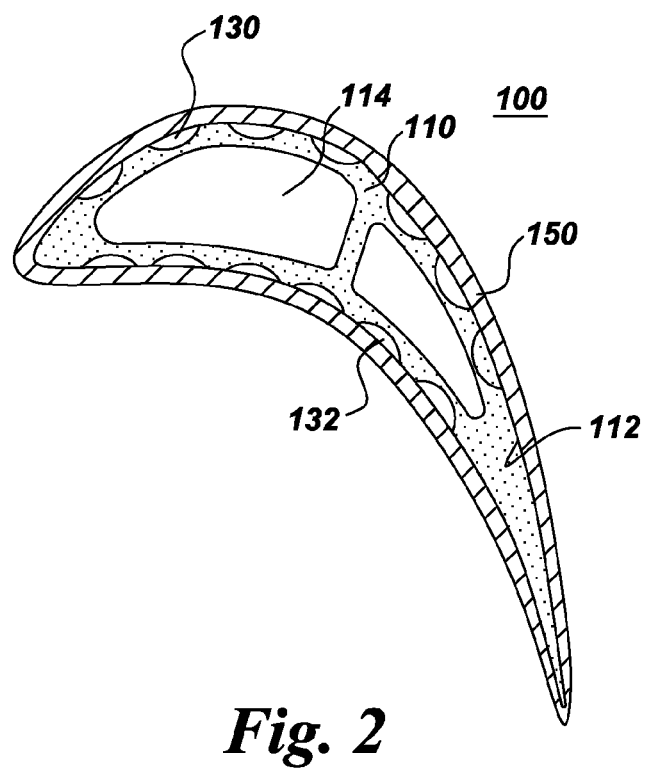
FIG. 2 is a schematic cross-section of an example airfoil configuration with cooling channels, in accordance with aspects of the present invention.

As indicated, for example, in FIG. 3, one or more access holes 140 are formed through the base 134 of a respective groove 132, to connect the groove 132 in fluid communication with the respective interior space 114 (FIG. 2). The access holes 140 are described above.

As indicated, for example, in FIG. 3, at least one connecting groove 232 is formed in the component 100 and intersects at least a subset of the one or more grooves 132. Each connecting groove 232 may be continuous or interrupted. That is, the connecting groove 232 may have an approximately constant depth or a smooth but tapered or curved depth. In addition, each connecting groove 232 may have a symmetric or an asymmetric footprint.

Although the cooling channels 130 are shown in FIG. 3 as being evenly spaced, for other configurations (not expressly shown), the spacing between the channels 130 may vary. Further, although the cooling channels 130 are shown as having the same volume, for other configurations (not expressly shown), the volume of the respective cooling channels 130 may vary. Moreover, although the connecting grooves 232 shown in FIG. 3, comprise straight connecting grooves 232, for other arrangements (not shown), the connecting groove comprises a curved connecting groove. Similarly, the walls of the connecting groove may be straight, as shown in FIG. 4, angled as shown in FIG. 6 or curved (not expressly shown).

The component 100 further includes a coating 150 disposed over at least a portion of the outer surface 112 of the substrate 110. The coating comprises one or more layers and is described above. As shown in FIG. 3, for example, the groove(s) 132 and the coating 150 together define one or more channels 130 for cooling the component 100. As also shown in FIG. 3, for example, the coating does not completely bridge the connecting groove 232, such that the connecting groove 232 at least partially defines an exit region 62 for the respective one or more cooling channels 130.

More particularly, a connecting groove 232 is not provided with an access hole 140 for direct communication with the interior space 114, such that coolant from the interior space 114 flows into the connecting groove 232 through the channels 130.

For the example arrangement shown in FIG. 11, the base 134 of each groove 132 is wider than its top 136, such that each groove 132 comprises a re-entrant shaped groove 132, and such that each channel 130 comprises a re-entrant shaped channel 130. Re-entrant shaped cooling channels are described above with reference to FIG. 11. For other arrangements, the channels 130 are open (as indicated, for example in FIG. 3). The connecting groove 232 may be open (as shown in FIG. 4, for example) or re-entrant shaped (as discussed below with reference to FIG. 12).

For the example arrangement shown in FIG. 3, multiple grooves 132 are formed in the component 100, such that multiple cooling channels 130 are defined together by the coating 150 and the grooves 132. For the particular arrangement shown in FIG. 3, at least one connecting grooves 232 is oriented approximately perpendicular to the cooling channels 130. However, for the example arrangement shown in FIG. 7, the connecting groove 232 has a non-orthogonal angle (β in FIG. 7) of incidence relative to the cooling channels 130. For example, β may be within a range of 20-70 degrees. Beneficially, angling the connecting groove relative to the cooling channels causes the coolant to exit onto the outermost surface to form a more effective cooling layer on that surface relative to the direction of the hot gas flow over the component.

For the example arrangement shown in FIG. 6, at least one connecting groove 232 has an angled exit wall 66. For example, the exit wall 66 may be oriented at an angle α relative to the surface 112 of the substrate, where α is in a range of about 20° to about 90°. Beneficially, lower values of the angle α enhance attachment of the cooling flow to the outer surface of the coated component 100.

Referring now to FIG. 12, for example configurations, each connecting groove 232 is re-entrant shaped, and a permeable slot 244 extends through the coating 150 in the exit region 62 for the connecting groove 232. Permeable slots 244 are described above with reference to FIG. 12. For other configurations (FIGS. 4 and 5, for example), the connecting groove 232 is open-shaped, and a portion of the coating 150 may be disposed in the exit region 62. Beneficially, this residual coating within the exit region 62 serves as a protective measure.

As noted above, for the example configurations shown in FIGS. 3 and 7, the grooves 132 and connecting grooves 232 are formed in the outer surface 112 of the substrate 110. For the example configurations shown in FIGS. 10 and 11, the coating 150 comprises inner and outer structural coating layers 54, 56 and the grooves 132 and connecting grooves 232 are formed at least partially in the inner structural coating 54. For the configurations shown in FIGS. 10 and 11, the grooves and connecting grooves do not extend into the substrate 110. For other configurations, the grooves and connecting grooves extend through the inner structural coating layer 54 into the substrate 110.

Beneficially, by forming full-depth connecting grooves to connect the exits of the other cooling channels, the process of locating and machining the final exits is simplified, as the entire length of the cooling channels is known (visually and by programmed machining). More generally, the above-described manufacturing method simplifies the formation of exit regions for the cooling channels by forming connecting channels instead of individual film holes.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A manufacturing method comprising:
   forming two or more grooves in a component that comprises a substrate with an outer surface, wherein the substrate has at least one interior space, and wherein each of the two or more grooves extends at least partially along the substrate and has a base;
   forming one or more access holes through the base of a respective one of the two or more grooves and at a first end of the respective groove, to connect the groove in fluid communication with respective ones of the at least one interior space; and forming at least one connecting groove in the component such that the at least one connecting groove intersects at least two of the two or more grooves at an opposed second end of the respective groove and wherein the at least one connecting groove is formed extending from the outer surface of the substrate to a same depth as that of each of a respective grooves of the subset of the two or more grooves;

disposing a coating over at least a portion of the outer surface of the substrate, such that the two or more grooves and the coating together define two or more channels for cooling the component, wherein the coating does not bridge the connecting groove along a length of the connecting groove, such that the connecting groove at least partially defines an exit region for the respective two or more cooling channels and wherein a portion of the coating remains as a residual coating within the exit region and on the base of a respective one of the connecting grooves to at least partially fill the connecting groove and provide a cooling flow distributor.

2. The manufacturing method of claim 1, further comprising casting the substrate prior to forming the two or more grooves and the one or more connecting grooves, wherein each groove is formed by directing an abrasive liquid jet at the outer surface of the substrate, and wherein each connecting groove is formed using the abrasive liquid jet.

3. The manufacturing method of claim 1, wherein each of the one or more connecting grooves is open-shaped, and wherein a portion of the coating is disposed in the exit region of respective connecting grooves, the manufacturing method further comprising removing at least a portion of the coating disposed in each exit region.

4. The manufacturing method of claim 1, wherein the two or more grooves and the one or more connecting grooves are formed in the outer surface of the substrate.

5. The manufacturing method of claim 1, wherein the coating comprises an outer layer of a structural coating, the manufacturing method further comprising depositing an inner layer of the structural coating on the outer surface of the substrate prior to forming the two or more grooves and the one or more connecting grooves, wherein each groove and connecting groove are formed at least partially in the inner structural coating.

6. The manufacturing method of claim 1, wherein the base of each groove is wider than the top, such that each groove comprises a re-entrant shaped groove.

7. The manufacturing method of claim 1, wherein each of the one or more connecting grooves is re-entrant shaped, and wherein a permeable slot extends through the coating in the exit region for the connecting groove.

8. The manufacturing method of claim 7, further comprising forming at least one exit hole through the permeable slot.

9. A component comprising
a substrate comprising an outer surface and an inner surface, wherein the inner surface defines at least one interior space, wherein the component defines two or more grooves,
wherein each of the two or more grooves extends at least partially along the substrate and has a base, wherein one or more access holes are formed through the base of a respective groove and at a first end of the respective groove, to connect the groove in fluid communication with respective ones of the at least one interior space, wherein the component further defines at least one connecting groove that intersects at least two of the two or more grooves at an opposed second end of the respective groove and wherein the at least one connecting groove is formed extending from the outer surface of the substrate to a same depth as that of each of a respective groove of the at least two of the two or more grooves; and a coating disposed over at least a portion of the outer surface of the substrate, wherein the two or more grooves and the coating together define two or more channels for cooling the component, and wherein the coating does not completely bridge the connecting groove along a length of the connecting groove, such that the connecting groove at least partially defines an exit region for the respective two or more cooling channels and wherein a portion of the coating remains as a residual coating within the exit region and on the base of a respective one of the connecting grooves to at least partially fill the connecting groove and provide a cooling flow distributor.

10. The component of claim 9, wherein the connecting groove is not provided with an access hole for direct communication with the at least one interior space, such that coolant from the interior space flows into the connecting groove through the channels.

11. The component of claim 9, wherein each of the two or more grooves has a top, wherein the base of the respective groove is wider than the top, such that each groove comprises a re-entrant shaped groove, and such that each channel comprises a re-entrant shaped channel.

12. The component of claim 9, wherein a plurality of grooves are formed in the component, wherein a plurality of cooling channels are defined by the coating and the grooves, and wherein at least one of the one or more connecting grooves is oriented approximately perpendicular to the cooling channels.

13. The component of claim 9, wherein a plurality of grooves are formed in the component, wherein a plurality of cooling channels are defined by the coating and the grooves, and wherein at least one of the one or more connecting grooves has a non-orthogonal angle of incidence relative to the cooling channels.

14. The component of claim 9, wherein at least one of the one or more connecting grooves has an angled exit wall.

15. The component of claim 9, wherein each of the one or more connecting grooves is re-entrant shaped, and wherein a permeable slot extends through the coating in the exit region for the connecting groove.

16. The component of claim 15, wherein at least one exit hole extends through the permeable slot.

17. The component of claim 9, wherein the coating comprises an inner structural coating layer disposed on the outer surface of the substrate and an outer structural coating layer disposed on the inner structural coating layer, wherein each groove and connecting groove are formed at least partially in the inner structural coating layer.

18. The component of claim 9, wherein the outer surface of the substrate defines the two or more grooves and the one or more connecting groove.

* * * * *